(12) United States Patent
Lake

(10) Patent No.: US 7,794,633 B2
(45) Date of Patent: Sep. 14, 2010

(54) METHOD AND APPARATUS FOR FABRICATING LENS MASTERS

(75) Inventor: Rick Lake, Meridian, ID (US)

(73) Assignee: Aptina Imaging Corporation, Grand Cayman (KY)

(*) Notice: Subject to any disclaimer, the term of this patent is extended or adjusted under 35 U.S.C. 154(b) by 0 days.

(21) Appl. No.: 12/324,362

(22) Filed: Nov. 26, 2008

(65) Prior Publication Data

US 2010/0127412 A1 May 27, 2010

(51) Int. Cl.
*B29D 11/00* (2006.01)
(52) U.S. Cl. .................. 264/1.38; 264/2.5; 264/259; 264/496; 264/220; 264/225; 264/293
(58) Field of Classification Search ........... 264/1.38, 264/2.5, 259, 496, 219, 220, 225, 226, 293; 216/2, 45; 249/134; 425/385, 386, 387.1, 425/403, 404, 810
See application file for complete search history.

(56) References Cited

U.S. PATENT DOCUMENTS

| | | | | |
|---|---|---|---|---|
| 2,206,797 A | * | 7/1940 | Williams | 76/107.1 |
| 4,545,478 A | * | 10/1985 | Waldman | 206/5.1 |
| 4,822,536 A | * | 4/1989 | Voinis et al. | 264/446 |
| 5,871,653 A | | 2/1999 | Ling | |
| 6,129,866 A | | 10/2000 | Hamanaka et al. | |
| 6,324,010 B1 | * | 11/2001 | Bowen et al. | 359/622 |
| 6,653,705 B2 | | 11/2003 | Ushijima et al. | |
| 6,814,901 B2 | * | 11/2004 | Itoh | 264/1.38 |
| 6,982,833 B2 | | 1/2006 | Nemoto | |
| 7,580,190 B2 | * | 8/2009 | Kim et al. | 359/620 |
| 2001/0033712 A1 | * | 10/2001 | Cox et al. | 385/33 |
| 2005/0151285 A1 | * | 7/2005 | Grot | 264/1.36 |
| 2006/0273478 A1 | * | 12/2006 | Jin et al. | 264/1.32 |
| 2007/0216048 A1 | * | 9/2007 | Rudmann et al. | 264/1.7 |
| 2007/0267765 A1 | * | 11/2007 | Ansell et al. | 264/1.36 |

FOREIGN PATENT DOCUMENTS

JP         06160763 A  *  6/1994
JP      2008290357 A  *  12/2008

OTHER PUBLICATIONS

English machine translation of JP06160763, supplied by JPO, retrieved Sep. 25, 2009.*
Pan et al, Microplastic Lens Array Fabricated by a Hot Intrusion Process, 2004, J. of Microelectromechanical Systems, vol. 13, No. 6, pp. 1063-1071.*

* cited by examiner

*Primary Examiner*—Joseph S Del Sole
*Assistant Examiner*—Timothy Kennedy
(74) *Attorney, Agent, or Firm*—Dickstein Shapiro LLP

(57) ABSTRACT

A method and apparatus used for forming a lens master for forming lenses on a wafer. The method includes using an inverted lens pin mold in conjunction with a dispense method to create both concave and convex lens masters for making lens stamps containing lens-shaped cavities. The lens-shaped cavities are used to imprint a plurality of lenses into a curable material.

19 Claims, 16 Drawing Sheets

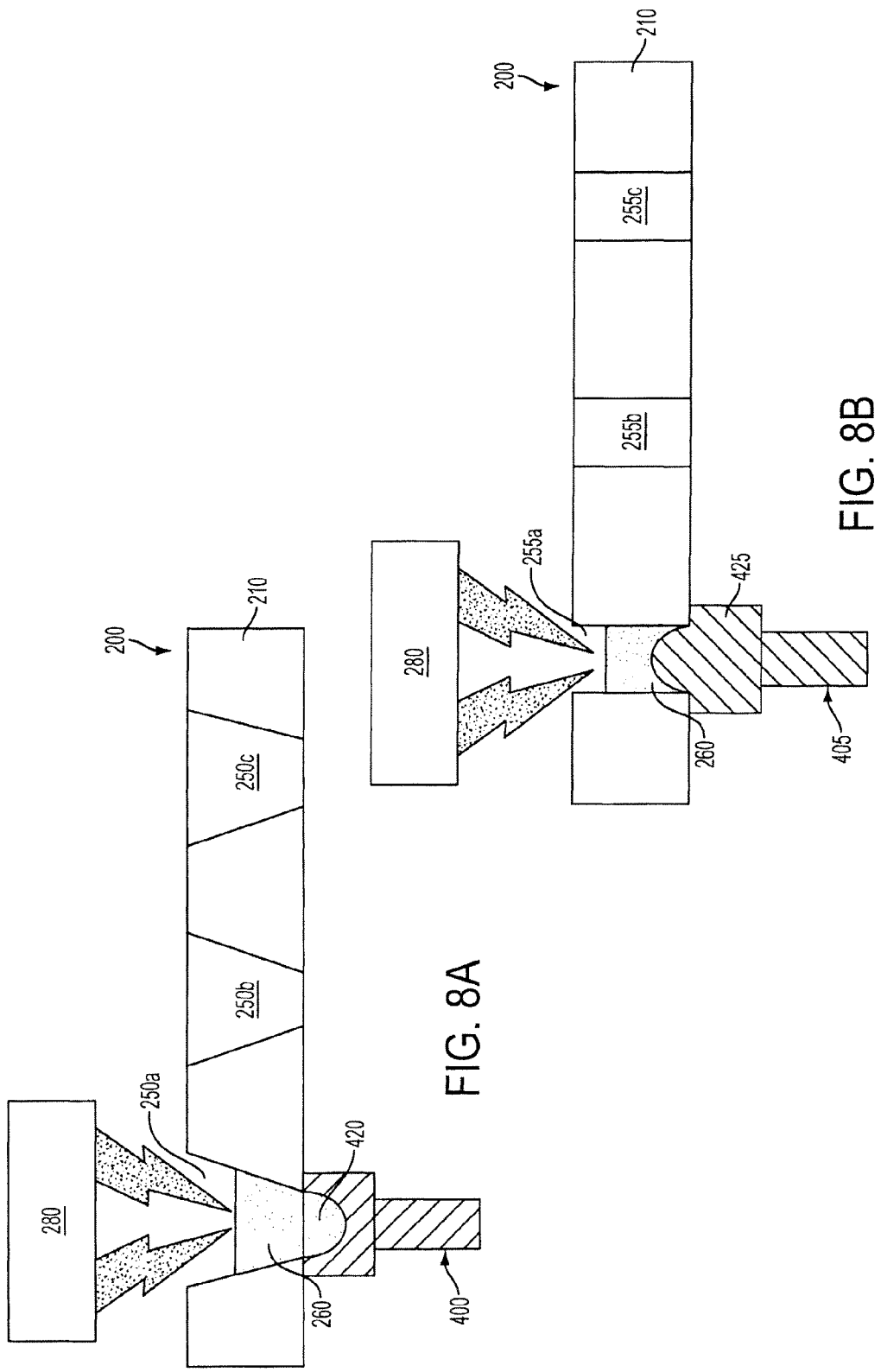

METHOD AND APPARATUS FOR FABRICATING LENS MASTERS

FIELD OF THE INVENTION

The embodiments described herein relate to optical lenses and methods of making the same.

BACKGROUND OF THE INVENTION

Microelectronic imagers are used in a multitude of electronic devices. As microelectronic imagers have decreased in size and improvements have been made with respect to image quality and resolution, they have become commonplace devices and are used in mobile telephones and personal digital assistants (PDAs) in addition to their traditional uses in digital cameras.

Microelectronic imagers include image sensors that typically use charged coupled device (CCD) systems and complementary metal-oxide semiconductor (CMOS) systems, as well as other solid state imager systems.

As shown in FIG. 1, microelectronic imager modules 150 are often fabricated at a wafer level. The imager module 150 includes an imager die 108, which includes an imager array 106 and associated circuits (not shown). The imager array 106 may be a CCD or CMOS imager pixel array, or any other type of solid state imager array. The imager module 150 may also include a lens structure 112, having a spacer 109 and at least one lens element 111 arranged on a lens wafer 510. Spacer 109 maintains the lens element 111 at a proper distance from the imager array 106, such that light striking the lens element 111 is directed appropriately to the imager array 106. The spacer 109 may be bonded to the imager die 108 by a bonding material 104 such as epoxy. Typically, the lens element 111 comprises one or more optically transmissive lenses made of glass or plastic material configured to focus light radiation onto the imager array 106. In addition, the lens structure 112 may be combined with another optically transmissive element, such as a package lid. The fabrication of one such imager module and associated lens support structure is discussed in co-owned U.S. patent application Ser. No. 11/605,131, filed on Nov. 28, 2006 and U.S. patent application Ser. No. 12/073,998, filed on Mar. 12, 2008.

In practice, imager modules 150 are fabricated in mass rather than individually. As shown in a top-down view in FIG. 2A and a cross-sectional view in FIG. 2B, multiple imager dies 108a-108d, each die including a respective imager array 106a-106d, are fabricated on an imager wafer 90. As shown in FIGS. 3A and 3B, multiple lens elements 111a-111d, corresponding in number and location to the imager arrays 106a-106d on the imager wafer 90 (FIGS. 2A and 2B), may be fabricated on a lens wafer 510 using a replication process such as ultraviolet embossing to duplicate the surface topology of a lens master 480, 485 onto a thin film of an ultraviolet-curable epoxy resin applied to the lens wafer 510. As shown in FIG. 4A, lens wafer 510 is placed so that it is separated from imager wafer 90 by spacers 109. Additionally, lens wafer 510 is located such that lens elements 111a-111d are optically aligned with imager dies 108a-108d to form a plurality of imager modules 150a, 150b (other imager modules are formed, but not shown in FIG. 4A). As shown in FIG. 4B, the imager modules 150a, 150b may then be separated into individual imager modules 150a, 150b by dicing.

One technique for creating convex lens masters 480 necessary for a lens replication process to form multiple lens elements 111a-111d (FIG. 3B) is a jet dispense process. The jet dispense process includes dispensing an appropriate polymer for lens formation onto a glass substrate. Once polymer is applied, a concave lens pin mold 400 is brought from above the polymer and glass substrate to stamp a shape into the polymer. Once the concave lens pin mold 400 is used to shape the polymer, a curing process solidifies the polymer. Once cured, the concave lens pin mold 400 can be removed and the process repeated until the lens master 480 is complete.

The jet dispense process for creating a lens master, however, suffers from certain shortfalls. A first shortfall is that it is difficult to maintain uniform thickness of the lens elements 111a-111d (FIG. 3B) because bonding is done polymer-to-glass. The cured polymer that comprises lens elements 111a-111d is co-extensive with the edges of the lens wafer. Consequently, depending on the uniformity of the jet dispense process, and accuracy of the lens pin mold 400 placement, lens thickness may vary among the edges of the lens master. Any thickness variation is passed on directly to each stamp 300 made from the lens master 480, and ultimately to the lens elements 111a-111d (FIG. 3B) made from the stamp 300. This variation in edge thickness can also be translated to any stacking elements that are bonded to the polymer of the lens elements. Accordingly, a uniform thickness among the lens elements 111 (FIG. 3B)—initiated by a uniform lens master 480—lowers adhesive bond line thickness and makes adhesion of any necessary stacking elements more reliable. Additionally, thickness that is non-uniform may result in chipping or delamination of the polymer at the dicing stage of production, which can lead to decreased image quality.

A second shortfall of the jet dispense process is its comparably low-throughput because each individual lens mold of the lens master 480 must be formed individually. This is necessary in order to ensure uniformity of lenses. The time consuming nature, however, makes it even more essential that the lens master 480 produced—which can be used to make multiple stamps 300—be as close to perfect as possible. Third, jet dispense processes commonly produce residual polymer volume (e.g., sputter) outside the lens area, which can cause problems with formation of other lenses on the lens wafer 510 (FIG. 3B). Fourth, controlling polymer dispense volume is difficult with the jet dispense process and must be precisely maintained for each lens. Fifth, lenses produced by jet dispense processes can have voiding problems as a result of trapped air bubbles. Sixth, accuracy of individual lens alignment on the lens wafer varies directly with the accuracy of the dispensing process. Accordingly, there is a need for a method of fabricating lens masters 480, 485 that yields stamps 300, 305 for forming discrete cured lenses 540, 545 that mitigates against the drawbacks of the jet dispense process.

BRIEF DESCRIPTION OF THE DRAWINGS

FIGS. 6A-9B illustrate steps of a method of making a lens master according to an example embodiment described herein.

DETAILED DESCRIPTION OF THE INVENTION

Figure 1:
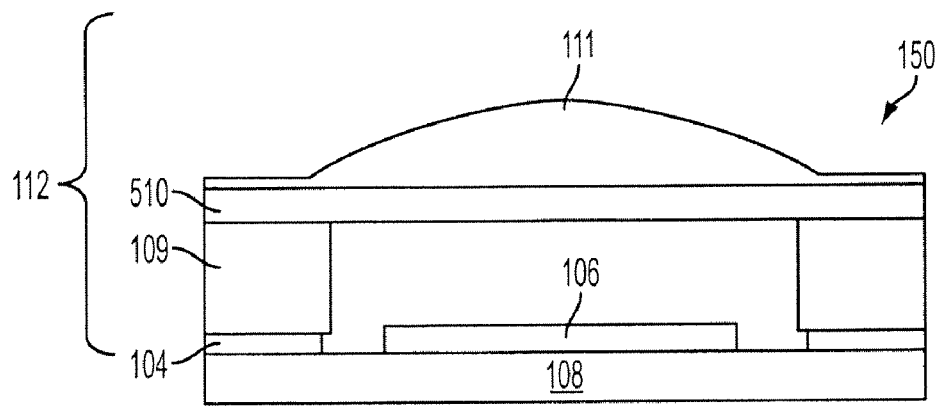
FIG. 1 illustrates an imager module.

In the following description, reference is made to the accompanying drawings which form a part hereof, and in which are shown by way of illustrations specific embodiments that may be practiced. It should be understood that like reference numerals represent like elements throughout the drawings. These example embodiments are described in sufficient detail to enable those skilled in the art to practice them. It is to be understood that other embodiments may be utilized, and that structural, material and electrical changes may be made, only some of which are discussed in detail below.

Figure 2A:
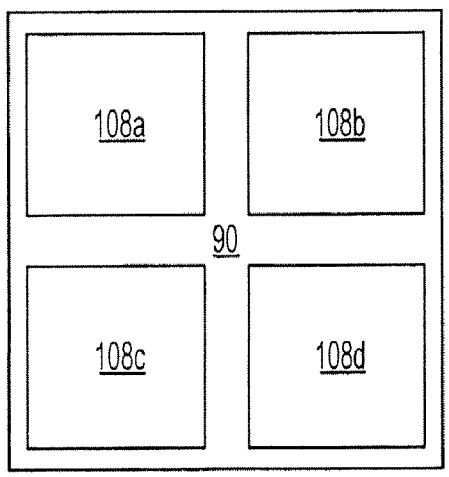
FIGS. 2A-2B illustrate an imager wafer assembly.
Figure 2B:
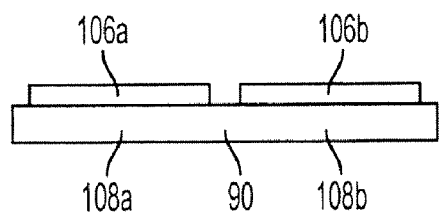
Figure 3A:
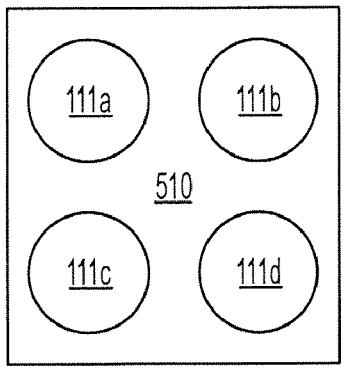
FIGS. 3A-3B illustrate a lens wafer assembly.
Figure 3B:
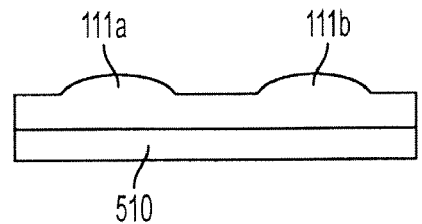
Figure 4A:
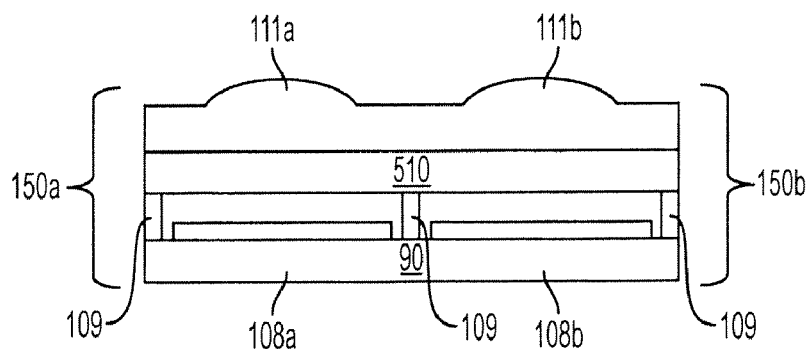
FIGS. 4A and 4B illustrate an imager module assembly.
Figure 4B:
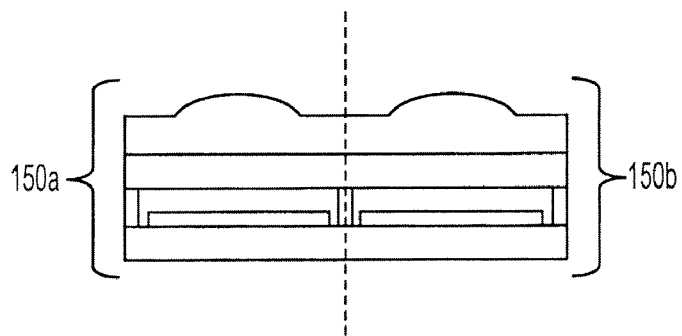
Figure 5A:
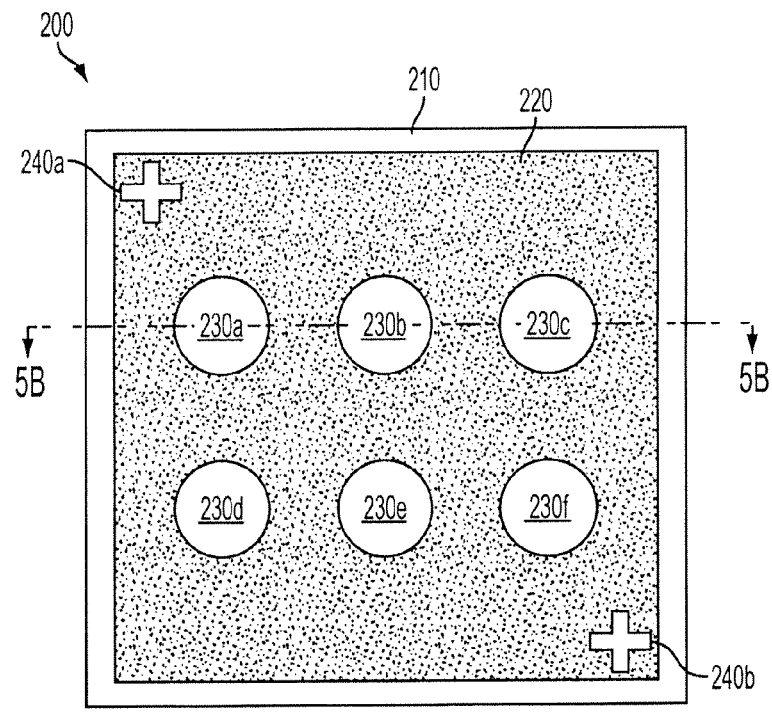
FIGS. 5A-5B illustrate top and cross-sectional views, respectively, of a substrate and mask for making a master mold structure according to an example embodiment described herein.
Figure 5B:
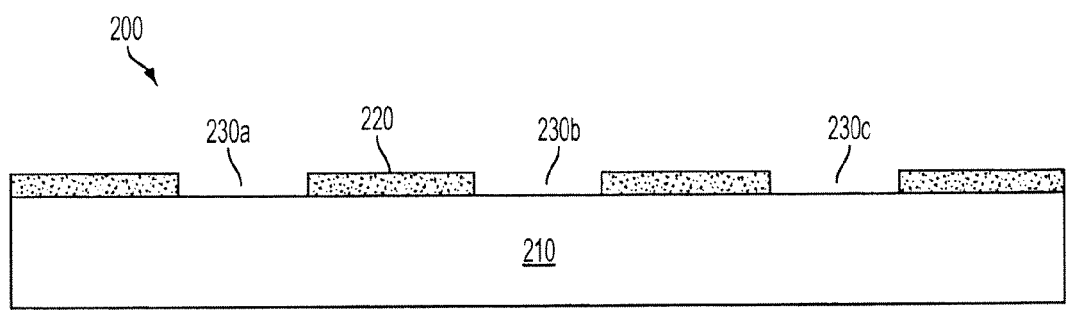
Figure 13A:
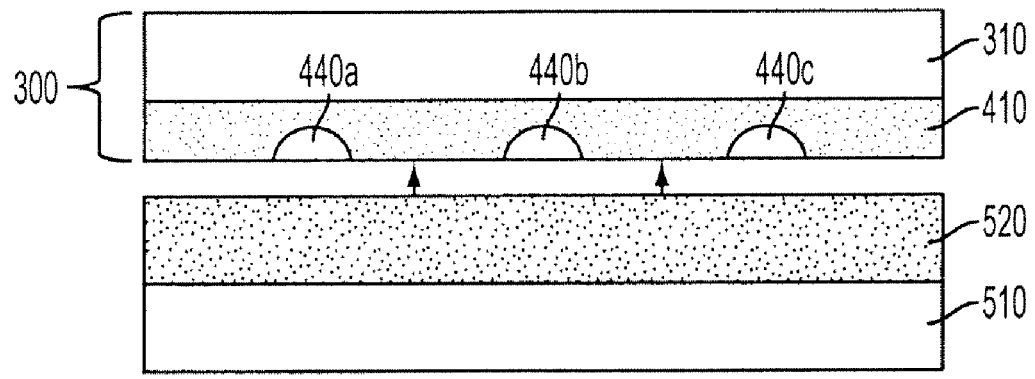
FIGS. 13A-16B illustrate steps in a method of making lens elements, according to an example embodiment described herein.
Figure 13B:
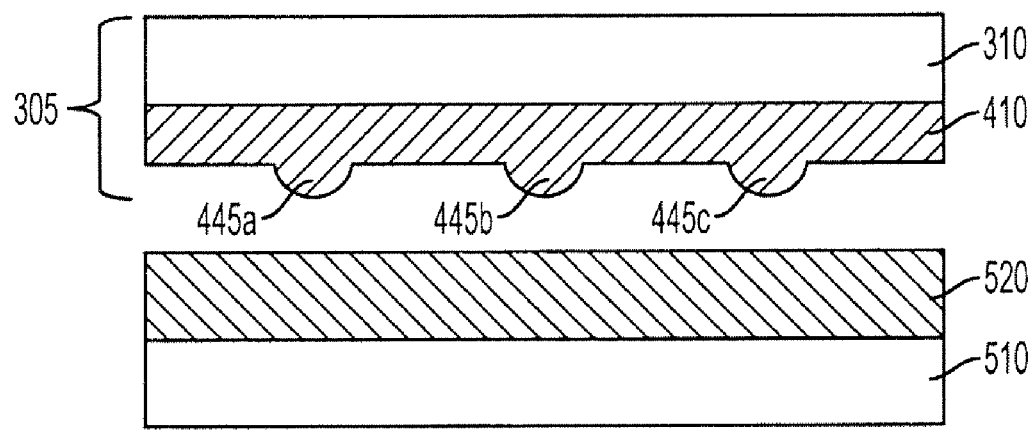

Embodiments described herein relate to a method and apparatus for making a lens master 480, 485 (FIGS. 10A, 10B) and for making stamps 300, 305 (FIGS. 13A, 13B). The stamps are used to make discrete cured lenses 540, 545 (FIGS. 16A, 16B) on a lens wafer 510 (FIGS. 16A, 16B) by using a replication process with the stamp 300, 305 (FIGS. 13A, 13B). A method of forming the master mold structure 200 (FIGS. 6A, 6B) is now described. Referring to FIGS. 5A and 5B, to form master mold structure 200, a mask 220 is formed on a glass substrate 210 and patterned to form a plurality of aperture openings 230a-230f. Optional alignment marks 240a, 240b can also be formed on the mask 220 and into the glass substrate 210 depending on the alignment method chosen for aligning the lens wafer 510 with the imager wafer 90 (FIG. 2B). Aperture openings 230a-230f, although illustrated as circular in FIG. 5A, may be rectangular or other shapes as necessary to correspond to a desired lens shape.

In one embodiment, the glass substrate 210 may comprise a float glass. One example of a float glass that may be used is a boro-float glass with a coefficient of thermal expansion between 2 and 5, such as Borofloat® 33 from Schott North America, Inc. The mask 220 can be deposited on the surface of the glass substrate 210 by any suitable method. The mask 220 can be formed of any material suitable for use with the method selected for material removal ultimately used for forming holes in the glass substrate 210. For example, the mask 220 can be formed of a metal, such as black chromium, or silicon, or a matrix polymer, such as PSK™ 2000, manufactured by Brewer Science Specialty Materials, or JSR 812, manufactured by JSR Corporation. The aperture openings 230a-230f can be formed by photo patterning the mask 220 so that deposition of the mask 220 does not occur on certain portions of the glass substrate 210, or by removing portions of mask 220 using other suitable methods. The optional alignment marks 240a, 240b can be formed by the same methods used to form aperture openings 230a-230f.

Figure 6A:
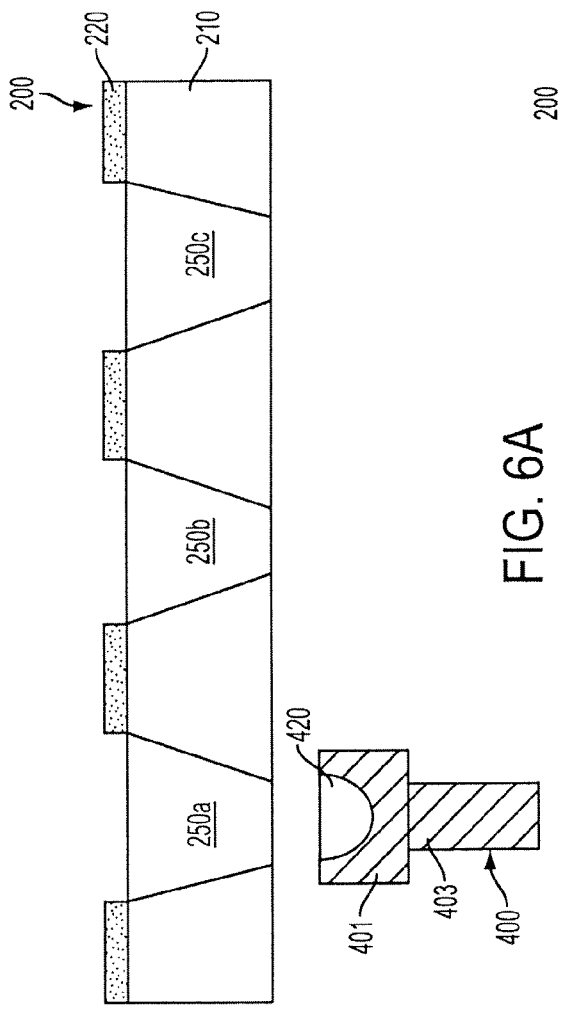
Figure 6B:
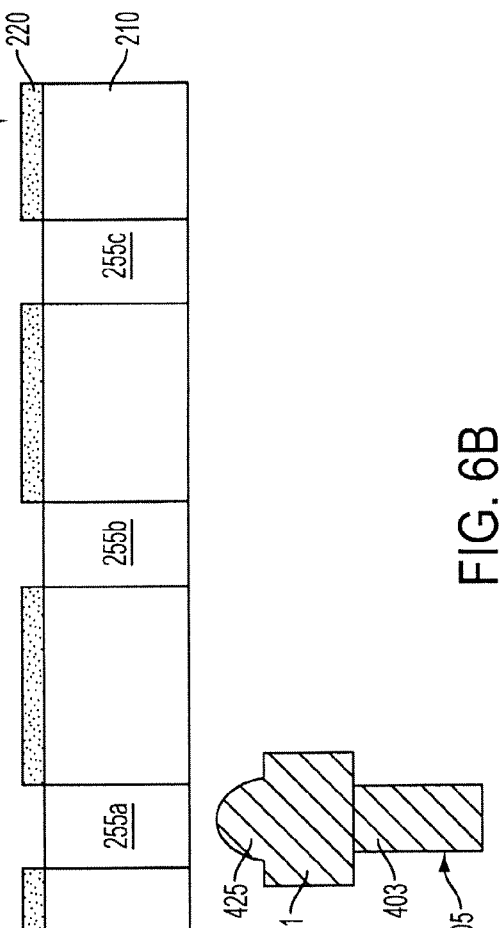

Referring now to FIGS. 6A and 6B, holes through the glass substrate 210 can be made using the mask 220. The shape of the holes will depend on both the method of material removal (i.e., sand blasting, chemical etching, etc.) and the pattern of the mask 220. The examples of potential shapes in FIG. 6A (tapered diameter holes 250a, 250b, 250c) and FIG. 6B (constant diameter holes 255a, 255b, 255c) are merely examples, and are not intended to be limiting. Once formation of the holes is complete, mask 220 can be removed by any appropriate method, such as photo patterning.

The illustrated lens pin molds 400, 405 each have a crown 401 and a handle 403. A lens pin feature 420, 425 is part of the crown 401. The lens pin feature 420 is a concave cavity 420, and lens pin feature 425 is a convex structure 425 that is roughly bullet shaped, but these two embodiments are not intended to be limiting. A cavity or structure of any shape could be made in order to create a corresponding lens element 111 (FIG. 1). The lens pin features 420, 425 may be formed such that their size and shape substantially match the size and shape of hole 250, 255.

Figure 7A:
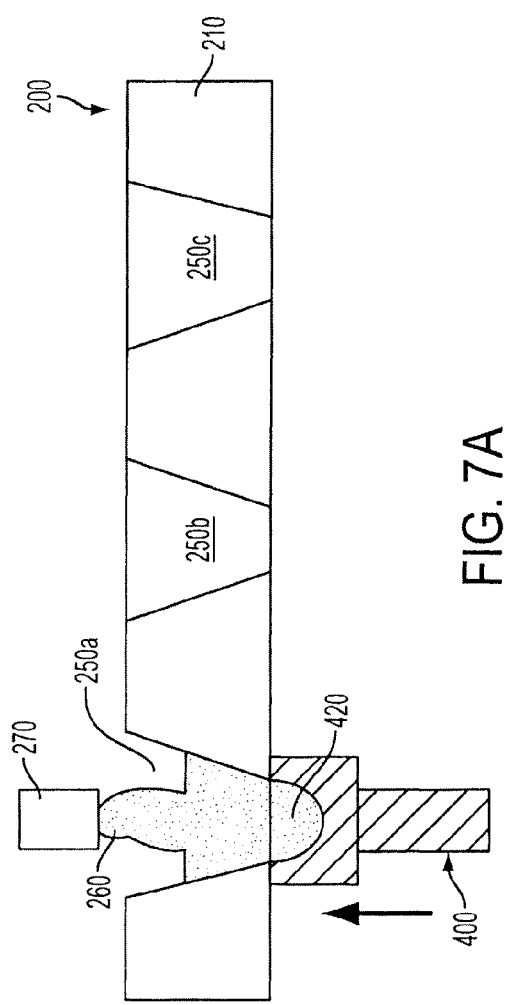
Figure 7B:
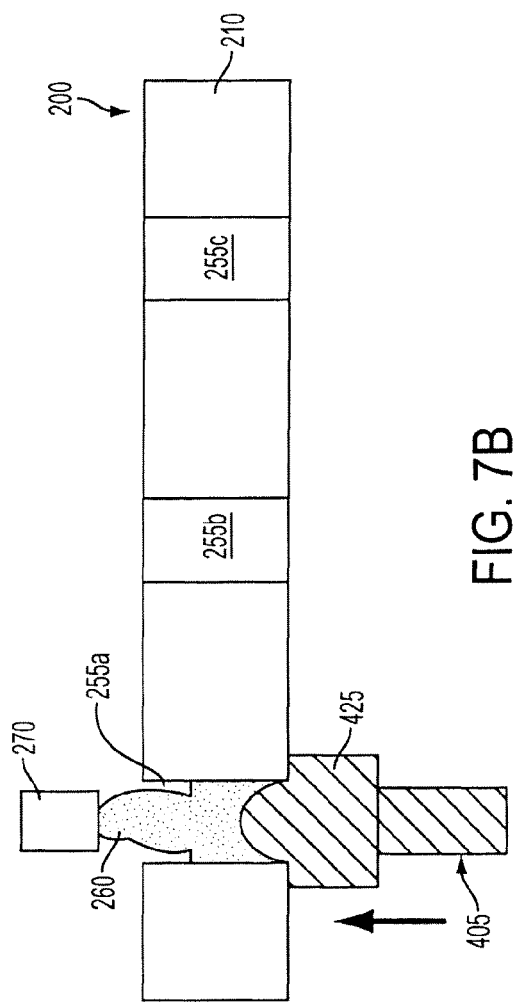

An inverted method of forming a lens master 480, 485 (FIGS. 10A, 10B) for making stamps 300, 305 (FIGS. 13A, 13B) using an inverted lens pin mold 400, 405 (FIGS. 6A, 6B) is now described. Referring to FIG. 7A, lens pin mold 400 is placed underneath glass substrate 210, and aligned with hole 250a to form a seal sufficient to prevent jet-dispense fluid 260 from escaping through the bottom of hole 250a. Upon formation of a sufficient seal, the jet dispenser 270 begins dispensing jet-dispense fluid 260 into hole 250a, filling the concave cavity of lens pin feature 420 of the concave lens pin mold 400 and some predetermined amount of hole 250a. Similarly, referring now to FIG. 7B, lens pin mold 405 can be placed underneath glass substrate 210, and aligned with hole 255a to form a seal sufficient to prevent jet-dispense fluid 260 from escaping through the bottom of hole 255a. Once a sufficient seal is formed, the jet dispenser 270 dispenses the jet-dispense fluid 260 into hole 255a, surrounding the convex structure of lens pin feature 425 of the convex lens pin mold 405 and some predetermined amount of hole 255a. The jet-dispense fluid 260 forms a planar upper surface within hole 250a prior to curing.

Figure 9A:
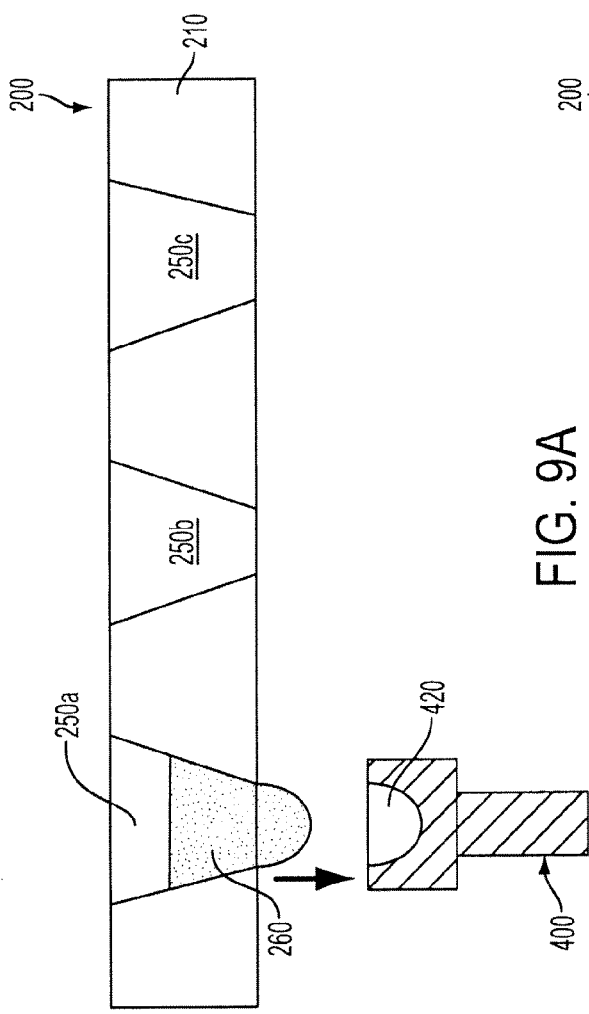
Figure 9B:
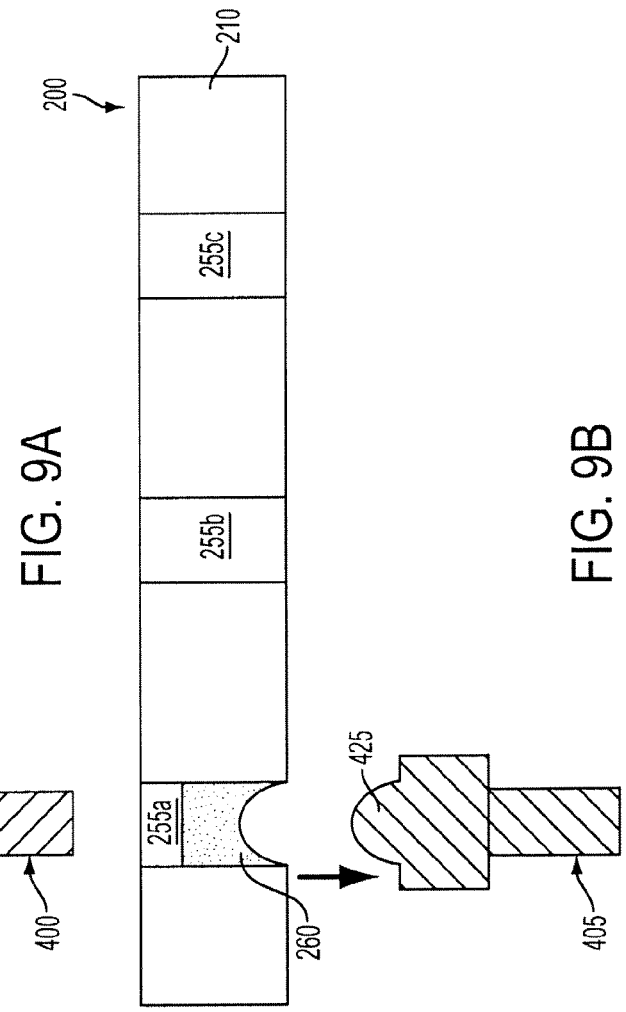
Figure 10A:
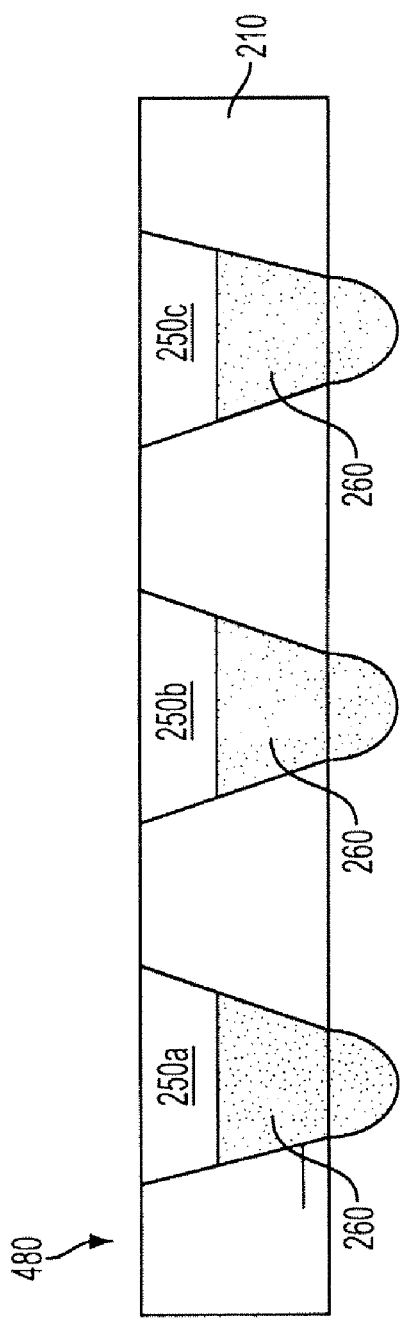
FIGS. 10A-10B illustrate completed lens masters.
Figure 10B:
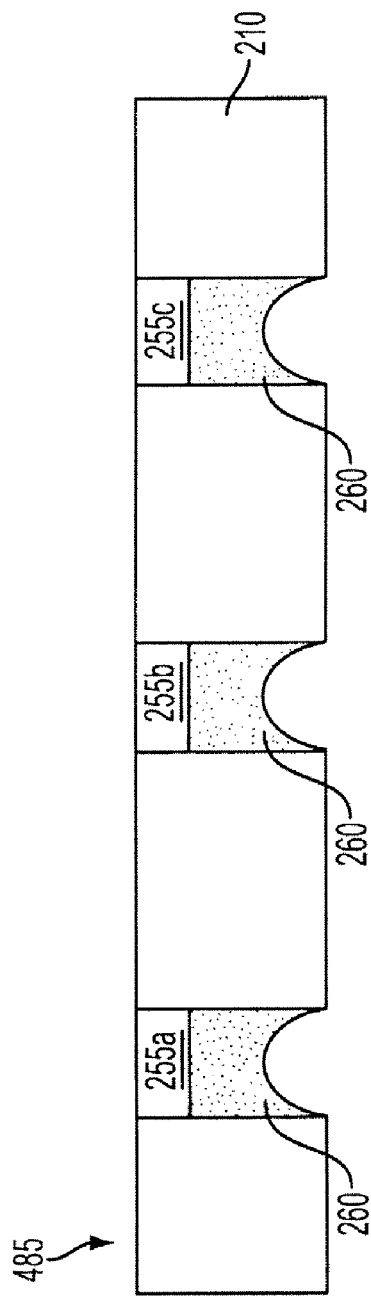

Whether using concave lens pin mold 400 or convex lens pin mold 405, the next step is curing the jet-dispense fluid 260. Referring now to FIGS. 8A and 8B, with the lens pin mold 400, 405 still in sufficient contact to prevent leaks, curing is conducted by curing apparatus 280 to solidify the jet-dispense fluid 260. Depending on the jet-dispense fluid 260 used curing may be completed by exposing the jet-dispense fluid 260 to ultra-violet light, but other techniques for curing are also available. Once curing is complete, referring now to FIGS. 9A and 9B, the lens pin mold 400, 405 is removed and prepared for a similar process for holes 250b, 250c, and 255b, 255c. Referring now to FIGS. 10A and 10B, the filling and curing process is repeated until each hole 250a-250c, 255a-255c is filled, and the master mold structure 200 (FIGS. 9A, 9B) is formed into either a concave lens master 480 or a convex lens master 485.

The inverted method described above has numerous advantages over other jet-dispense methods. First, referring again to FIGS. 7A and 7B, maintaining uniformity of thickness of lens elements 111 (FIG. 1) is simpler because the concave lens pin mold 400 can be sized to sufficiently match holes 250a, 250b, 250c so that minimal jet-dispense fluid 260 is co-extensive with the edges of glass substrate 210. With respect to convex lens pin molds 405, depending on its design, lens pin mold 405 can be used such that there is almost no jet-dispense fluid 260 that is co-extensive with the edges of glass substrate 210. As such, maintaining uniform thickness of both lens masters 480, 485 (FIGS. 10A, 10B) is simpler, and the accuracy is passed on to the stamp 300, 305 (FIGS. 13A, 13B), and ultimately on to the cured lenses 540, 545 (FIGS. 16A, 16B) made from the stamp 300, 305 (FIGS. 13A, 13B). This uniformity results in lower adhesive bond line thickness and makes adhesion of any necessary stacking elements more reliable, while also reducing chipping or delamination at the dicing stage of production. Second, the disclosed inverted method can reduce or eliminate residual polymer volume (e.g., sputter) outside the lens area. Third, the disclosed inverted method can eliminate voiding. Fourth, accuracy of the jet dispenser 270 with respect to both positioning and volume of fluid dispensed is less critical. Fifth, the disclosed inverted method can avoid air bubbles that can cause problems with formation of other lenses on the lens wafer. Finally, the cumulative result of each of these characteristics being improved by the inverted method is a more uniform lens master 480, 485 (FIGS. 10A, 10B).

An additional advantage of the inverted method is the ability to use the convex lens pin mold 405. With the other jet dispense methods—where jet-dispense fluid 260 is put onto a glass substrate 210 and the lens pin mold 400, 405 is brought from above the glass substrate 210—there is no apparatus for sufficiently containing the flow of the jet-dispense fluid 260 to enable use of a convex lens pin mold 405. In contrast, when the inverted method is used the convex lens pin mold 405 can be positioned prior to dispensing the jet-dispense fluid 260, thereby creating a cavity 255a sufficient to contain the jet-dispense fluid 260 until curing is complete and the convex lens pin mold 405 is removed (FIG. 9B).

Figure 11A:
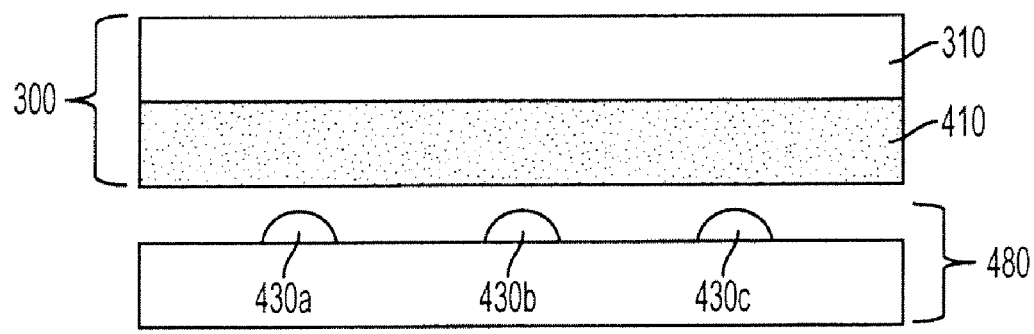
FIGS. 11A-12B illustrate steps of a method of making a stamp according to an example embodiment described herein.
Figure 11B:
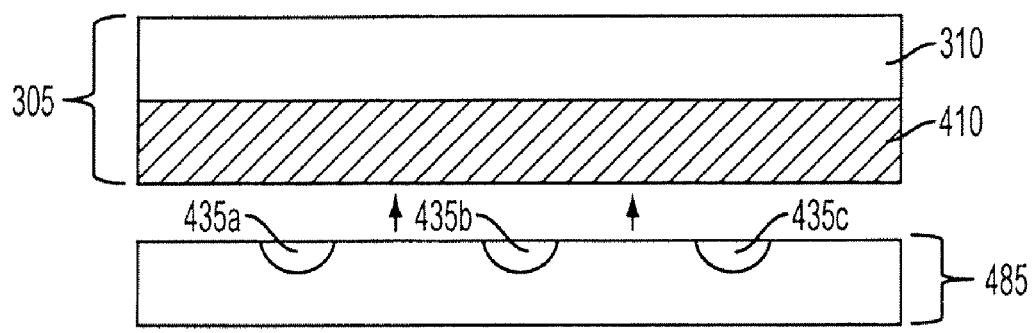
Figure 16A:
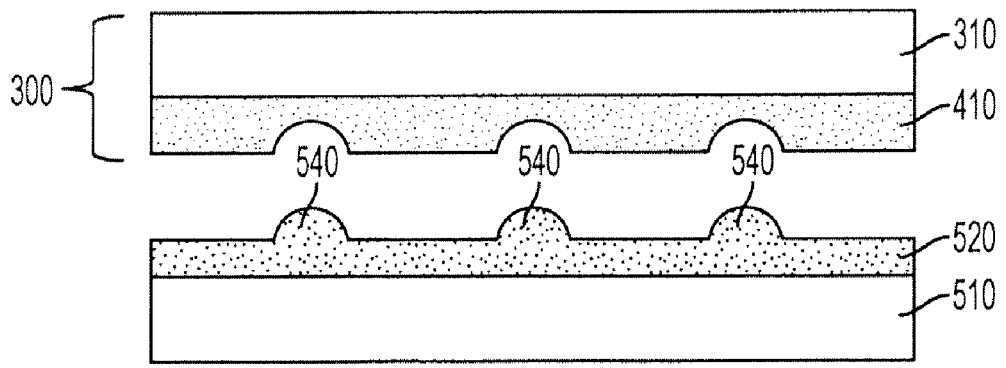
Figure 16B:
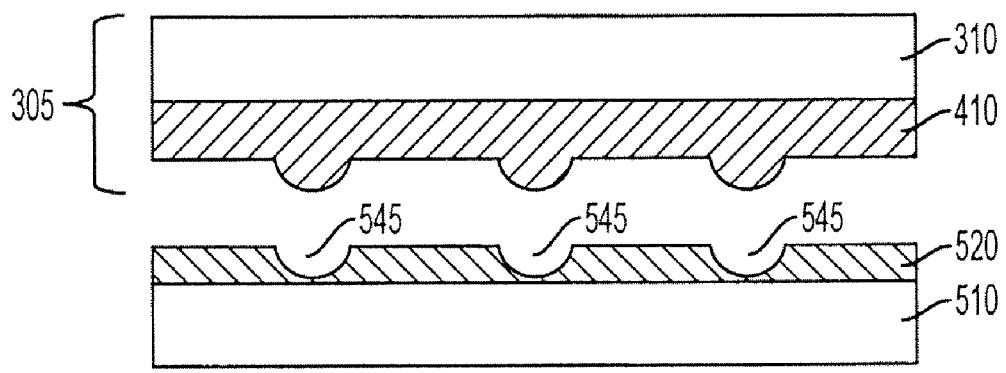
Figure 17A:
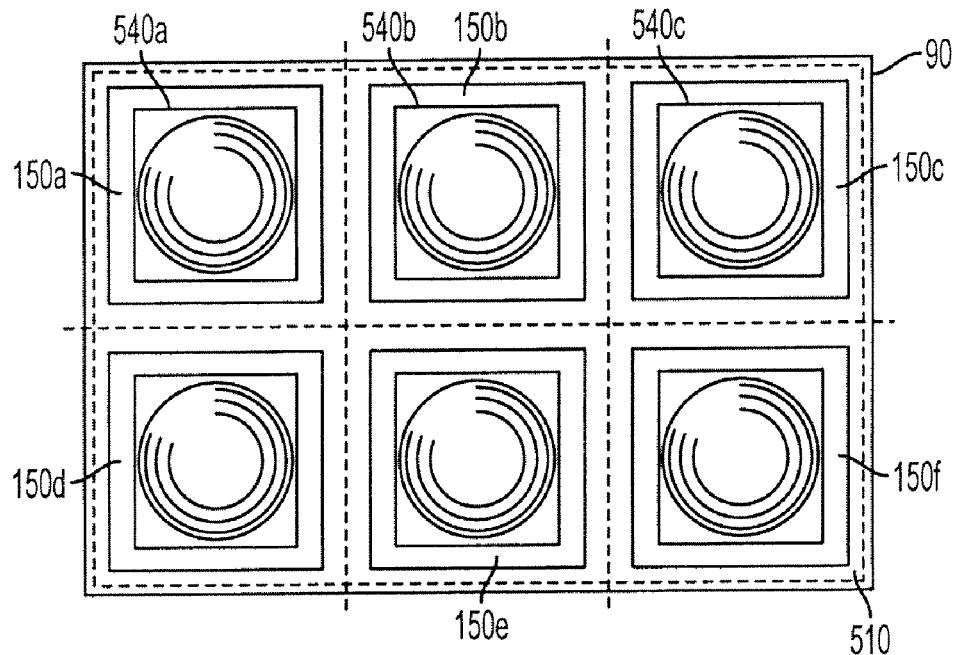
FIGS. 17A-18B illustrate top and cross-sectional views of assembled imager modules constructed using lenses made using methods and apparatuses in accordance with an example embodiment described herein.
Figure 17B:
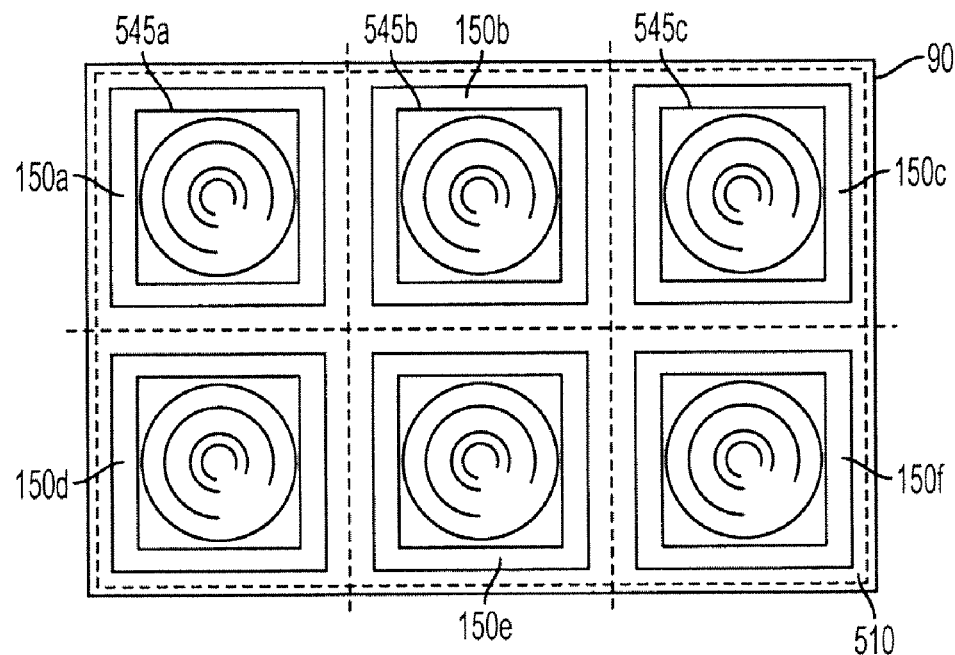
Figure 18A:
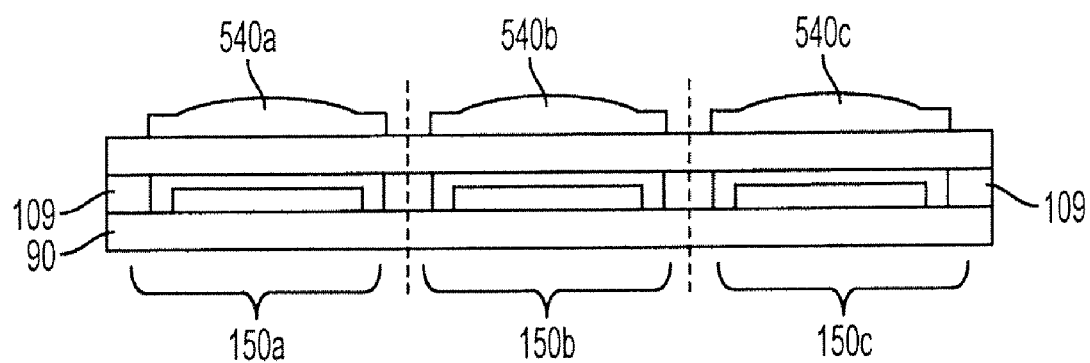
Figure 18B:
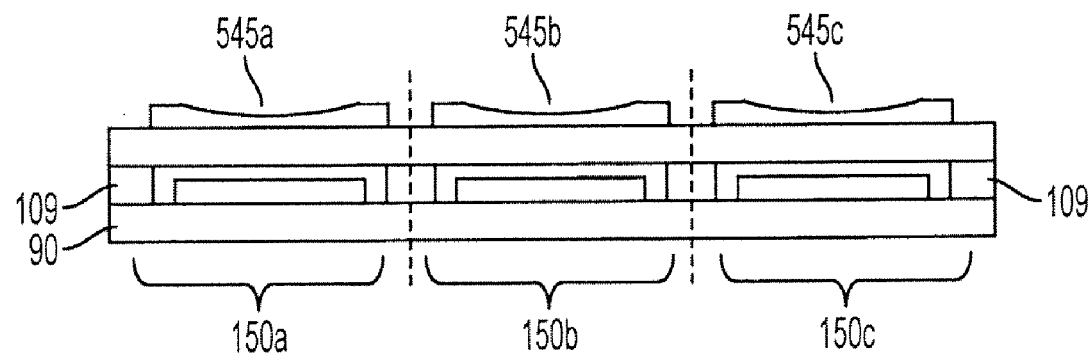

Referring now to FIGS. 11A and 11B, once either the concave lens master 480 or the convex lens master 485 is fabricated, they can be used in a process to create cured convex lenses 540 (FIG. 16A) and cured concave lenses 545 (FIG. 16B), respectively. The process includes using the lens master 480, 485 to form a stamp 300, 305, and then using the stamp 300, 305 to form the lenses 540, 545 (FIGS. 16A, 16B). In order to present one common process, the lens pin molds 400, 405 (FIGS. 6A, 6B), master wafers 480, 485, stamps 300, 305, and cured lenses 540, 545 (FIGS. 16A, 16B) are referred to generically, as opposed to referring to their concave or convex shape. Despite this shorthand, it is important to note that in a first embodiment a concave lens pin mold 400 (FIG. 6A) is used to make a convex lens master 480, which is used to make a concave stamp 300 (FIG. 13A), which is used to make convex cured lenses 540 (FIG. 16A). In a second embodiment, a convex lens pin mold 405 (FIG. 6B) is used to make a concave lens master 485, which is used to make a convex stamp 305 (FIG. 13B), which is used to make concave cured lenses 545 (FIG. 16B).

Continuing to refer to FIGS. 1A and 1B, transparent material 410 is formed on a glass substrate 310. The transparent material 410 may be optionally bonded to the glass substrate by an adhesive agent, such as Hexamethyldisilazane (HMDS). The transparent material 410 can be any suitable material, such as a polymer, and need not be completely transparent. In one embodiment, the transparent material 410 may be a material that is dissolvable in a weak solvent, for example, polyvinyl alcohol (PVA). In another embodiment, the transparent material 410 can be polydimethylsiloxane (PDMS). The lens master 480, 485 is reoriented and aligned to stamp 300, 305. Lens master 480, 485 can be aligned to stamp 300, 305 using the optional alignment marks 240a, 240b (FIG. 5A), or other suitable methods of alignment such as laser guiding can be used.

Figure 12A:
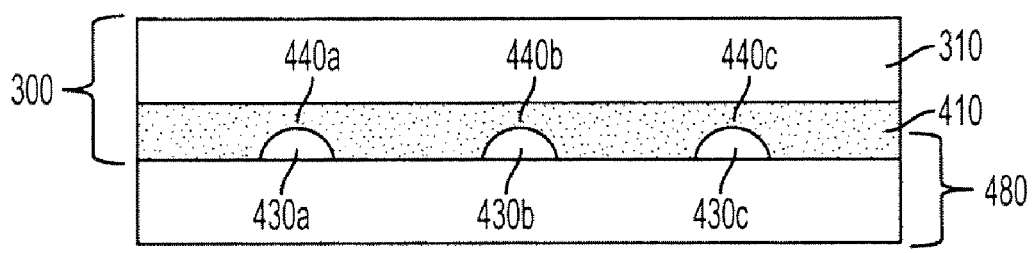
Figure 12B:
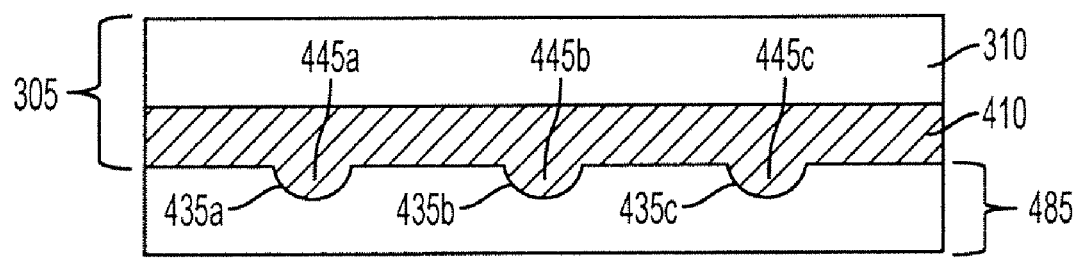

As shown in FIGS. 12A and 12B, the lens master features 430a-430c, 435a-435c are pressed into the transparent material 410 to create stamp features 440a-440c, 445a-445c. Next, the lens master 480, 485 is removed and the transparent material 410 is cured. In another embodiment, the transparent material 410 may be a material that requires heating to soften it before lens master 480, 485 can be pressed into the transparent material 410 to create stamp features 440a-440c, 445a-445c. In this embodiment the transparent material 410 hardens upon cooling.

While the embodiments described in FIGS. 11A-16B show cross-sectional views of a lens master 480, 485 (FIGS. 10A, 10B), a stamp 300, 305 (FIGS. 13A, 13B), cured convex lenses 540 (FIG. 16A), and cured concave lenses 545 (FIG. 16B) having six lens formations (only three lens formations are shown), it should be understood that, in practice, the master mold structure 200 (FIG. 5A) and any follow on lens structure may have tens, hundreds, or even thousands of lens cavities. It should also be understood that while the embodiments described in FIGS. 6A-16B detail the production of a single lens master 480, 485 to make a single stamp 300, 305 for making cured lenses 540, 545, multiple of any of these lens structures could be produced at any one time. For example, a lens pin mold 400, 405 could be used to make multiple lens masters 480, 485 prior to making stamps 300, 305. Alternatively, a lens master 480, 485 could be used to make multiple stamps 300, 305 prior to making the lens wafers 510.

Referring now to FIGS. 13A and 13B, a method of making a plurality of lens elements using the stamp 300, 305 is now described. Curable material 520 is applied to a lens wafer 510 and the lens wafer 510 is positioned under stamp 300, 305 and optionally aligned with alignment marks 240a, 240b (FIG. 5A). In one embodiment, the curable material 520 may be a low dispersion (Abbe number>50) ultraviolet-curable resist or other hybrid polymer that requires curing, and may be optionally bonded to the wafer lens 510 by an adhesive agent, such as Hexamethyldisilazane (HMDS). One example of such an ultraviolet-curable hybrid polymer is Ormocomp® from Micro Resist Technology.

Figure 14A:
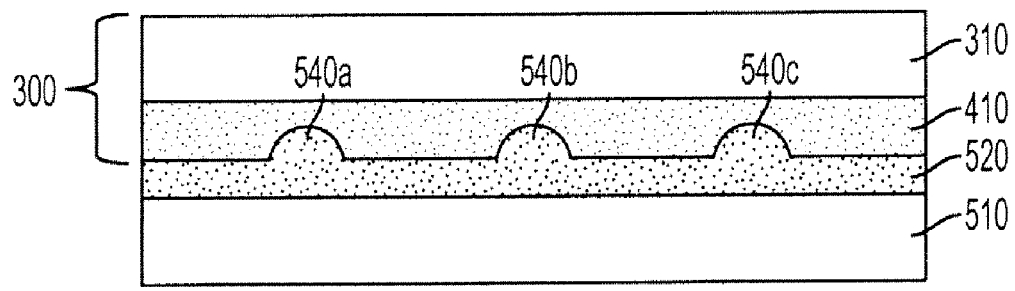
Figure 14B:
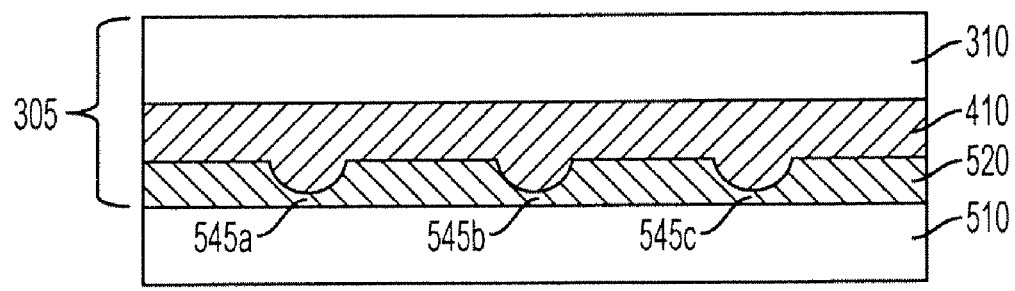
Figure 15A:
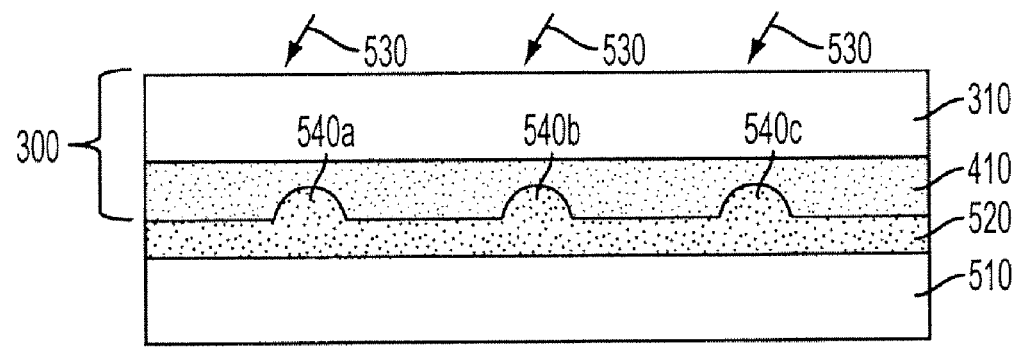
Figure 15B:
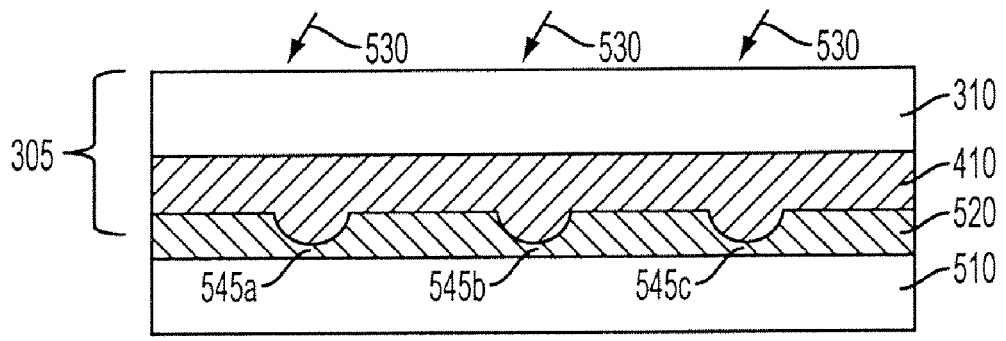

As shown in FIGS. 14A and 14B, stamp 300, 305 is used to imprint curable material 520 into lenses 540a-c, 545a-c. Referring now to FIGS. 15A and 15B, an ultraviolet source directs ultraviolet radiation 530 towards the glass substrate 310 of stamps 300, 305 for curing the curable material 520.

Referring now to FIGS. 16A and 16B, the lens wafer 510 is separated from the stamps 300, 305. In one embodiment, the stamp 300, 305 and lens wafer 510 can be placed in a weak solvent bath to dissolve any transparent polymer material 410 that remains uncured, leaving the cured lenses 540a-540c, 545a-545c. In this embodiment, the glass substrate 310 can be reused multiple times. In another embodiment, transparent material 410 is not dissolved and stamp 300, 305 can be mechanically separated from the lens wafer 510.

FIGS. 17A, 17B and 18A, 18B are top down and cross-sectional views, respectively, of assembled imager modules having cured lenses 540, 545 constructed in accordance with an embodiment described herein. As shown in FIGS. 17A, 17B and 18A, 18B, lens wafer 510 is placed so that it is separated from imager wafer 90 by spacers 109. Additionally, lens wafer 510 is located such that lenses 540, 545 are optically aligned with imager dies 108 (FIG. 2A) on an imager wafer 90 to form a plurality of imager modules 150a-f, which may then be separated into individual imager modules. Alternatively, the lens wafer 510 may be separated prior to being joined with imager dies.

Figure 19:
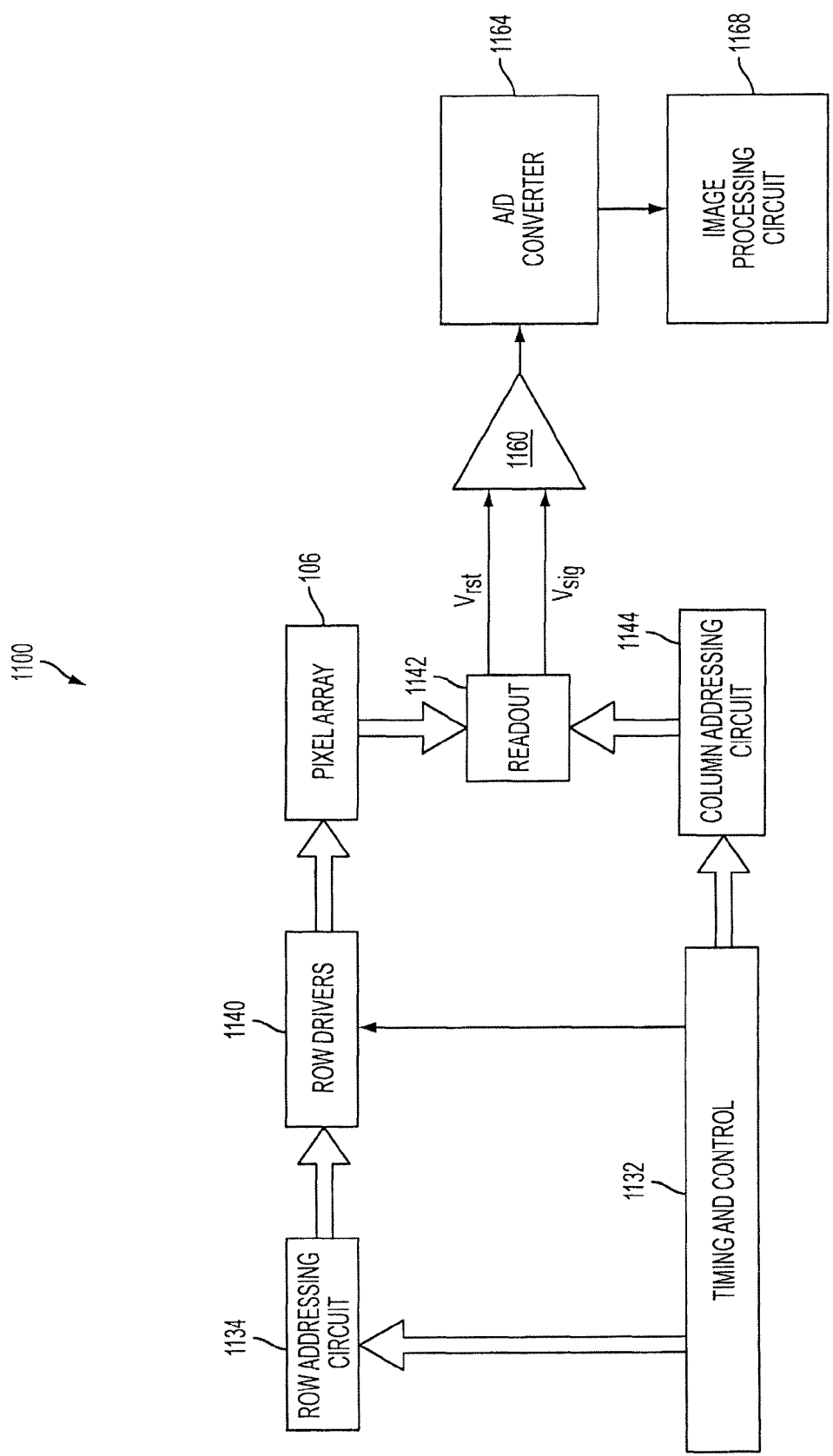
FIG. 19 illustrates a block diagram of a CMOS imaging device constructed using lenses made using methods and apparatuses in accordance with an example embodiment described herein.

FIG. 19 shows a block diagram of an imaging device 1100, (e.g. a CMOS imager), that may be used in conjunction with a lens 540, 545 according to embodiments described herein. A timing and control circuit 1132 provides timing and control signals for enabling the reading out of signals from pixels of the pixel array 106 in a manner commonly known to those skilled in the art. The pixel array 106 has dimensions of M rows by N columns of pixels, with the size of the pixel array 106 depending on a particular application.

Signals from the imaging device 1100 are typically read out a row at a time using a column parallel readout architecture. The timing and control circuit 1132 selects a particular row of pixels in the pixel array 106 by controlling the operation of a row addressing circuit 1134 and row drivers 1140. Signals stored in the selected row of pixels are provided to a readout circuit 1142. The signals are read from each of the columns of the array sequentially or in parallel using a column addressing circuit 1144. The pixel signals, which include a pixel reset signal Vrst and image pixel signal Vsig, are provided as outputs of the readout circuit 1142, and are typically subtracted in a differential amplifier 1160 and the result digitized by an analog to digital converter 1164 to provide a digital pixel signal. The digital pixel signals represent an image captured by an exemplary pixel array 106 and are processed in an image processing circuit 1168 to provide an output image.

Figure 20:
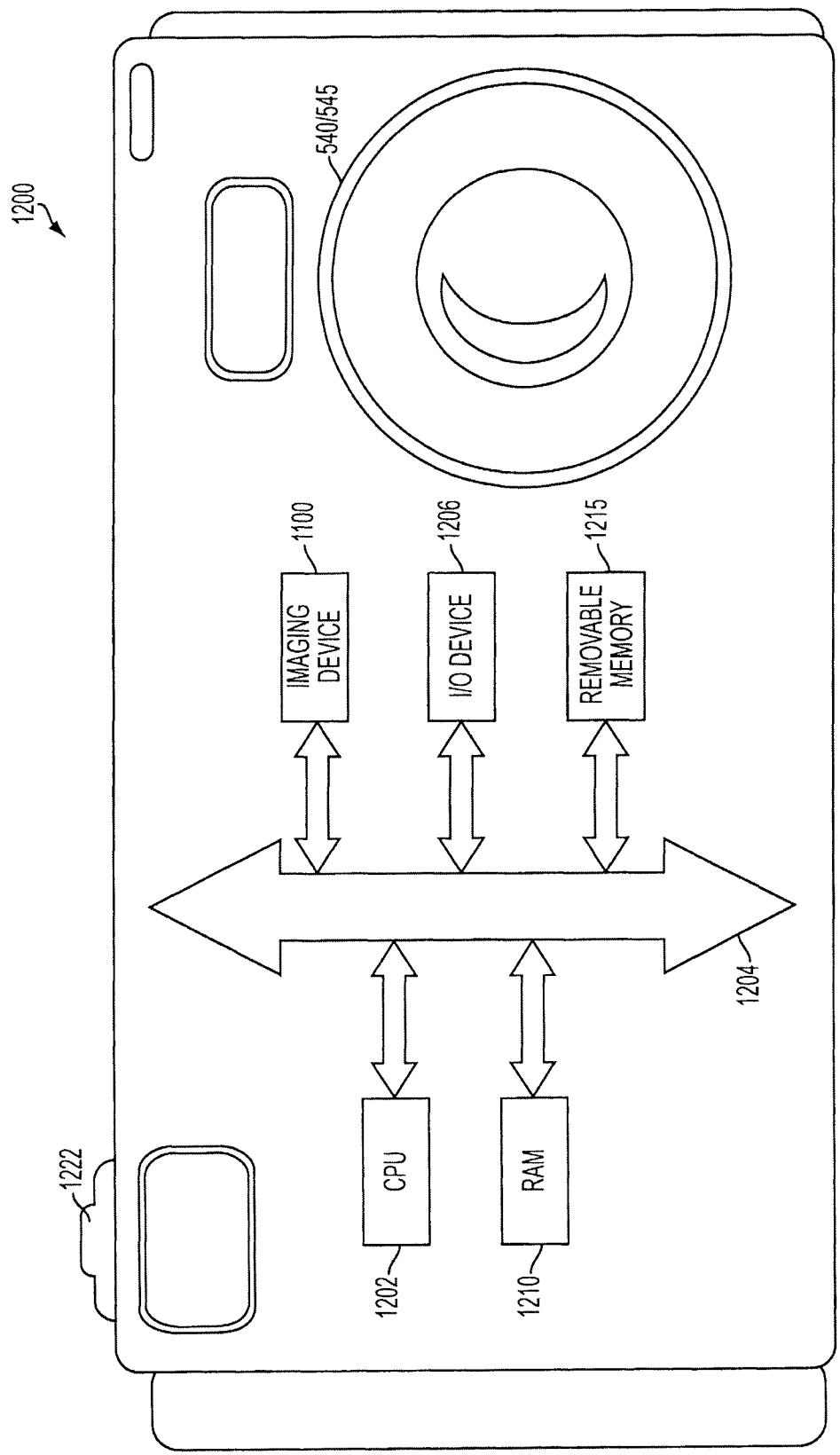
FIG. 20 depicts a system using lenses made with methods and apparatuses in accordance with an example embodiment described herein.

FIG. 20 shows a system 1200 that includes an imaging device 1100 and a lens 540, 545 constructed and operated in accordance with the various embodiments described above. The system 1200 is a system having circuits that include imaging device 1100. Without being limiting, such a system could include a computer system, camera system, scanner, machine vision, vehicle navigation, video telephone, surveillance system, auto focus system, star tracker system, motion detection system, image stabilization system, or other image acquisition system.

System 1200, e.g., a digital still or video camera system, generally comprises a central processing unit (CPU) 1202, such as a control circuit or microprocessor for conducting camera functions that communicates with one or more input/output (I/O) devices 1206 over a bus 1204. Imaging device 1100 also communicates with the CPU 1202 over the bus 1204. The processor system 1200 also includes random access memory (RAM) 1210, and can include removable memory 1215, such as flash memory, which also communicates with the CPU 1202 over the bus 1204. The imaging device 1100 may be combined with the CPU processor with or without memory storage on a single integrated circuit or on a different chip than the CPU processor. In a camera system, a lens 540, 545 according to various embodiments described herein may be used to focus image light onto the pixel array 106 of the imaging device 1100 and an image is captured when a shutter release button 1222 is pressed.

While embodiments have been described in detail in connection with the embodiments known at the time, it should be readily understood that the claimed invention is not limited to the disclosed embodiments. Rather, the embodiments can be modified to incorporate any number of variations, alterations, substitutions or equivalent arrangements not heretofore described. For example, while some embodiments are described in connection with a CMOS pixel imaging device, they can be practiced with any other type of imaging device (e.g., CCD, etc.) employing a pixel array or a camera using film instead of a pixel array.

Although certain advantages have been described above, those skilled in the art will recognize that there may be many others. For example, the steps in the methods described herein may be performed in different orders, or may include some variations, such as alternative materials having similar functions. Furthermore, while the substrate and stamps are described above in various embodiments as being transparent, alternate embodiments are possible in which the substrate and stamps are opaque and an alternate form of radiation to ultraviolet is used to cure the lenses. Accordingly, the claimed invention is not limited by the embodiments described herein but is only limited by the scope of the appended claims.

What is claimed as new and desired to be protected by Letters Patent of the United States is:

1. A method of forming a concave lens, the method comprising:
    a method of forming a concave lens master using a convex lens pin mold, the method comprising;
        positioning the convex lens pin mold below and sufficiently in contact with a substrate to form a seal, wherein the convex portion of the lens pin mold extends into a passage between the lower and upper surfaces of the substrate;
        dispensing curable material into the passage; and
        curing the curable material;
    forming a convex stamp using the concave lens master;
    applying curable material to a lens wafer;
    positioning the lens wafer and convex stamp to imprint the curable material into lenses with the stamp.

2. The method of claim 1, wherein the passage is tapered.

3. The method of claim 2, wherein the passage is tapered from the upper surface of the substrate to the lower surface of the substrate.

4. The method of claim 2, wherein the passage is tapered from the lower surface of the substrate to the upper surface of the substrate.

5. The method of claim 1, wherein a feature of the convex lens pin mold has a cross-sectional area substantially matching the cross sectional area of the passage.

6. The method of claim 1, wherein the curing is conducted by an ultraviolet-radiation source and the curable material is an ultraviolet-curable polymer.

7. The method of claim 1, wherein forming a convex stamp using the concave lens master further comprises:
    forming curable material on a substrate;
    pairing the lens master with the curable material such that lens master features create stamp features in the curable material; and
    curing the material of the stamp.

8. The method of claim 7, wherein the act of forming the curable material on the substrate comprises affixing the curable material to the substrate with an adhesive.

9. The method of claim 7, wherein pairing the lens master with the curable material further comprises aligning a lens master having at least one alignment mark to the curable material.

10. The method of claim 7 wherein the curable material is an ultraviolet-curable polymer.

11. A method of forming a lens stamp for use in wafer level lens formation, the method comprising:
    forming a lens master capable of creating a plurality of lens stamps, the method of forming the lens master comprising;
        pairing a lens pin mold having a lens pin feature with a passage through a substrate, the lens pin mold forming a seal with the substrate surrounding the passage;
        dispensing curable material into the passage, the curable material covering the lens pin feature;
        curing the curable material such that the material takes on a form inverse to the lens pin feature;
        separating the lens pin mold from the passage;
        preparing the lens pin mold for pairing with a second passage;
        repeatedly pairing the lens pin mold, dispensing the curable material, curing the curable material, separating the lens pin mold, and preparing the lens pin mold in to form a plurality of filled passages with shapes inverse to the lens pin feature; and pairing the lens master with curable material formed on a substrate such that the plurality of filled passages contact the curable material to form a plurality of lens stamp features capable of yielding a plurality of identical lenses.

12. The method of claim 11, wherein the lens pin feature is a concave cavity.

13. The method of claim 11, wherein the lens pin feature is a convex structure.

14. The method of claim 13, wherein the convex feature is bullet shaped.

15. The method of claim 11, wherein a portion of the lens pin feature has a size and shape substantially matching the size and shape of the passage.

16. The method of claim 11, wherein the passage is substantially circular.

17. The method of claim 11, wherein the passage has tapered walls.

18. The method of claim 17, wherein the passage is tapered from a top portion of the passage to a bottom portion of the passage.

19. The method of claim 17, wherein the passage is tapered from a bottom portion of the passage to a top portion of the passage.

* * * * *